US012348572B2

(12) United States Patent
Klein et al.

(10) Patent No.: US 12,348,572 B2
(45) Date of Patent: *Jul. 1, 2025

(54) SYSTEM AND METHOD FOR USING SOFTWARE DEFINED NETWORKING IN INTERNET PROTOCOL MULTIMEDIA SUBSYSTEMS

(71) Applicant: AT&T Intellectual Propery I, L.P., Atlanta, GA (US)

(72) Inventors: Reuben Klein, East Brunswick, NJ (US); Brian Dean Freeman, Farmingdale, NJ (US); Larry B. Pearson, San Antonio, TX (US); Leopold B. Strahs, Williamsburg, VA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 163 days.

This patent is subject to a terminal disclaimer.

(21) Appl. No.: 17/810,629

(22) Filed: Jul. 4, 2022

(65) Prior Publication Data

US 2022/0337635 A1 Oct. 20, 2022

Related U.S. Application Data

(63) Continuation of application No. 16/736,331, filed on Jan. 7, 2020, now Pat. No. 11,381,606, which is a
(Continued)

(51) Int. Cl.
*H04L 65/1016* (2022.01)
*H04L 9/40* (2022.01)
(Continued)

(52) U.S. Cl.
CPC .......... *H04L 65/1016* (2013.01); *H04L 45/02* (2013.01); *H04L 45/036* (2022.05);
(Continued)

(58) Field of Classification Search
CPC ....... H04L 45/02; H04L 45/036; H04L 45/38; H04L 45/64; H04L 63/083;
(Continued)

(56) References Cited

U.S. PATENT DOCUMENTS 8,306,531 B2   11/2012  Zhu et al.
8,601,144 B1   12/2013  Ryner
(Continued)

FOREIGN PATENT DOCUMENTS

CN      103532672 A    1/2014
WO      2014115157 A1  7/2014

OTHER PUBLICATIONS

Lin, Pingping, et al., "Seamless Interworking of SDN and IP," Proceedings of the ACM SIGCOMM 2013 conference on SIGCOMM. ACM, 2013, 2 pages.
(Continued)

Primary Examiner — Thomas J Dailey

(57) ABSTRACT

Software Defined Networking (SDN) is used in IMS in order to provide a mechanism to forward (Internet Protocol) IP packets and provide a simplified solution to the complex signaling path of IMS according to directives from an SDN Controller. SDN is used in at least three particular scenarios. In the first scenario, communications are simplified using SDN directed signaling disaggregation. In the second scenario, SDN is used to direct media function chaining. In the third scenario, the system can be used as an SDN based media relay.

20 Claims, 11 Drawing Sheets

Related U.S. Application Data continuation of application No. 14/803,663, filed on Jul. 20, 2015, now Pat. No. 10,554,694.

(51) Int. Cl.

| | |
|---|---|
| *H04L 45/00* | (2022.01) |
| *H04L 45/02* | (2022.01) |
| *H04L 45/036* | (2022.01) |
| *H04L 45/64* | (2022.01) |
| *H04L 65/1046* | (2022.01) |
| *H04L 65/1069* | (2022.01) |
| *H04L 65/1073* | (2022.01) |
| *H04L 67/01* | (2022.01) |
| *H04L 67/1021* | (2022.01) |
| *H04L 67/563* | (2022.01) |
| *H04W 12/069* | (2021.01) |

(52) U.S. Cl.
CPC .............. *H04L 45/38* (2013.01); *H04L 45/64* (2013.01); *H04L 65/1046* (2013.01); *H04L 65/1069* (2013.01); *H04L 65/1073* (2013.01); *H04L 67/01* (2022.05); *H04L 67/1021* (2013.01); *H04L 67/563* (2022.05); *H04W 12/069* (2021.01); *H04L 63/083* (2013.01)

(58) Field of Classification Search
CPC .............. H04L 65/1016; H04L 65/1046; H04L 65/1069; H04L 65/1073; H04L 67/01; H04L 67/1021; H04L 67/563; H04W 12/069

See application file for complete search history.

(56) References Cited

U.S. PATENT DOCUMENTS

| | | | | |
|---|---|---|---|---|
| 9,455,901 | B2* | 9/2016 | Davie | ............... H04L 45/16 |
| 9,749,221 | B2* | 8/2017 | Banavalikar | ............ H04L 45/64 |
| 2007/0118894 | A1 | 5/2007 | Bhatia | |
| 2009/0052445 | A1* | 2/2009 | Folkes | .................... H04L 45/02 709/242 |
| 2009/0141878 | A1 | 6/2009 | Ballard et al. | |
| 2011/0149956 | A1* | 6/2011 | Alt | .................... H04W 12/06 370/352 |
| 2012/0239727 | A1* | 9/2012 | Dutta | .................... G06F 9/5055 709/203 |
| 2012/0287922 | A1* | 11/2012 | Heck | .................... H04L 63/306 370/351 |
| 2013/0028179 | A1* | 1/2013 | Sedlacek | ............. H04L 65/1016 709/228 |
| 2013/0094445 | A1* | 4/2013 | De Foy | ................. H04L 45/021 370/328 |
| 2013/0266007 | A1 | 10/2013 | Kumbhare et al. | |
| 2013/0332619 | A1 | 12/2013 | Xie et al. | |
| 2014/0112150 | A1 | 4/2014 | Ko et al. | |
| 2014/0146674 | A1 | 5/2014 | Wang et al. | |
| 2014/0226467 | A1 | 8/2014 | Park | |
| 2014/0317256 | A1 | 10/2014 | Jiang et al. | |
| 2014/0330946 | A1 | 11/2014 | Hallivuori et al. | |
| 2015/0036505 | A1 | 2/2015 | Sparks et al. | |
| 2015/0078332 | A1 | 3/2015 | Sidhu et al. | |
| 2016/0099890 | A1 | 4/2016 | Kaufman | |
| 2016/0241601 | A1 | 8/2016 | Le Rouzic et al. | |
| 2016/0277509 | A1 | 9/2016 | Qiang | |
| 2016/0352629 | A1 | 12/2016 | Wang et al. | |

OTHER PUBLICATIONS

Salsano, Stefano, et al., "OSHI-Open Source Hybrid IP/SDN networking (and its emulation on Mininet and on distributed SDN testbeds)," arXiv preprint arXiv:1404.4806, 2014, 6 pages.

Ito, Manabu, et al., "OpenFlow-based Routing Mechanism for Call Session State Migration in the IMS," Recent Researches in Information Science and Applications, Jan. 2013, 8 pages.

"IP Multimedia Subsystem," IP Multimedia Subsystem—Wikipedia, the free encyclopedia, Dec. 16, 2014, http://en.wikipedia.org/wiki/IP_Multimedia_Subsystem, 18 pages.

"Understanding OpenFlow Flow Entry Timers on Devices Running Junos OS," Juniper Networks, Jan. 9, 2014, http://www.juniper.net/techpubs/en_US/junos13.3/topics/concept/junos-sdn-openflow-flow-entry-timers-overview.html 2 pages.

* cited by examiner

SYSTEM AND METHOD FOR USING SOFTWARE DEFINED NETWORKING IN INTERNET PROTOCOL MULTIMEDIA SUBSYSTEMS

CROSS-REFERENCE TO RELATED APPLICATIONS

This application is a continuation of U.S. patent application Ser. No. 16/736,331, filed Jan. 7, 2020, now U.S. Pat. No. 11,381,606, which is a continuation of U.S. patent application Ser. No. 14/803,663, filed Jul. 20, 2015, now U.S. Pat. No. 10,554,694, both of which are herein incorporated by reference in their entirety.

FIELD

The present disclosure relates generally to a system and method for using Software Defined Networking (SDN) in an Internet Protocol Multimedia Subsystem (IMS), and more particularly to a system and method for using SDN chaining in an IMS.

BACKGROUND

The signaling path for Internet Protocol Multimedia Subsystem (IMS) telephony servers is complex. Suppose that IMS is used to establish a communications session (via the exchange of Session Initiation Protocol messages, also known as SIP) between a sending device and a receiving device during a Voice over Internet Protocol (VoIP) call. In IMS, the use of multiple proxies, session control servers and application servers is required in order to handle each SIP message sent or received.

Specifically, a Session Initiation Protocol (SIP) client on a device sends and receives messages. The complex nature of the signaling path is necessary for the following reasons. First, it is needed in order to hide the internal server infrastructure from the client and from other network providers. Second, it is needed to ensure that applications are invoked in a proper order. Third, it is needed to route every signaling message to or from a particular user through the same server instances in order to maintain the context between multiple sessions associated with a single user.

IMS and similar architectures have employed proxies, which relay each message to a call session control function (CSCF) associated with a particular user, thereby adding hops to each message. All messages are anchored through a common CSCF in order to apply a series of tests, called filter criteria, to each SIP signaling message received. This adds processing overhead, before passing the message to an application server.

The application server performs processing on the message, and then returns the message back to the CSCF for additional or final handling. Often the SIP message is passed by the CSCF to another application server in a sequence, and this process may be repeated several times. Thus, all messages between application servers must route through the CSCF, which only handles well-formed SIP messages. Therefore, in order for any server in a sequence of application servers to change the flow of messages to another, downstream, application server, which is often required, header information must be added to a message and this header information must be tested by the CSCF as part of the filter criteria associated with a service. In the process, each message requires a great deal of computational processing. For example, when using a pre-paid service (e.g., using a pre-paid mobile telephone), any toll call may need to pass through a debit server which checks whether the user of the pre-paid service has sufficient balance to make the toll call. The debit server can terminate the toll call whenever the user's funds are insufficient and the user's balance runs out. However, if the call is a local, unmetered call, or an emergency call, the debit server would not be required. Therefore, a first application server may analyze the number, determine if the debit server is required (based on the type of number) and if it would be necessary to add some header to the SIP message. The first application server would then return the altered message to the CSCF which would require filter criteria associated with the user's service profile in order to test for this header. The CSCF would then determine if it should next invoke the debit server or not. Every subsequent SIP message passes through every initially invoked server, regardless of the type of the number (e.g., a toll call, a local call, an emergency call, etc.). Therefore, invoking the debit server unnecessarily may result in additional processing and overhead on each subsequent signaling message.

This results in a great deal of extra signaling in the platform needed to accomplish the process of communication of messages in IMS.

In addition to the above-described signaling load, media is also passed from the client to a secure media relay server and from there to a terminating media relay server and then to the receiving client. Every time the media goes to another relay server, the SIP signaling messages associated with the session must be rewritten to change the addresses and port numbers of the media connections. This adds further to processing overhead, as every signaling message has to be changed at every media hop. The flow of packets/data in messages that are transferred may be a multi-tier design in which every message from all users must always pass from a Proxy-CSCF (P-CSCF) tier to a Serving-CSCF (S-CSCF) tier, to an application server tier and then to an Interrogating-CSCF (I-CSCF) and so on to reach a receiving client. Thus, there is an extra amount of equipment required because the maximum traffic load which can be accommodated by the platform as a whole is based upon a worst-case flow through each tier. Such a system also sets a limit to the maximum number of users that can be hosted by a particular number of servers.

BRIEF SUMMARY

The present application provides a method and system for using software defined networking in IMS in order to provide a mechanism to forward internet protocol packets and provide a simplified solution to the complex signaling path of IMS by taking advantage of the ability of an SDN controller to issue directives on the forwarding of packets based upon a combination of factors.

In one embodiment, a method includes receiving a registration request from a first client associated with an internet protocol address. A forwarding table to map the media processing server to the internet protocol address of the first client is updated. A processing service is instantiated at the processing server. A request is received from the first client to establish communication with a second client and communication from the first client to the second client via the media processing server in response to the request is established. In one embodiment in which the establishing communication comprises establishing a first telephone call, the method further comprises determining that an additional media processing service is required for the first telephone call and instantiating an additional media processing service in response to the determining. In one embodiment, an invite message from a third client directed towards the first client is received to establish a second telephone call between the third and first client after termination of the first telephone call. A registrar is searched to check if the first client is available and to retrieve the internet protocol address of the first client. A media relay port for the third client is created and forwarding table configuration instructions to map each internet protocol address and port combination are provided to the media relay. It is then determined that no additional media processing services are required for the second telephone call. An accept message to the invite message from the first client is received and media from the third client is sent to a media relay for delivery to the first client. In one embodiment, the forwarding table is updated when the third client registers. A user device associated with the first client of the invite message is alerted wherein the receiving the accept message to the invite message is in response to the user picking up the invite message.

In one embodiment, the accept message comprises a payload specifying the media types that the first client can receive and internet protocol address and internet protocol ports used for contact with the first client. In one embodiment, credentials of the first client are received and tested against provisioned credentials stored at a credential server. In one embodiment, a class of service associated with an account is identified. In one embodiment, the media processing server receives a stream of packets representing encoded segments of one of audio and video media types. The media processing server may be a media relay server. In one embodiment, the plurality of media processing services comprises changing the encoding of the media stream for one of conversion and enhancement.

These and other advantages of the invention will be apparent to those of ordinary skill in the art by reference to the following detailed description and the accompanying drawings.

DETAILED DESCRIPTION

Figure 1:
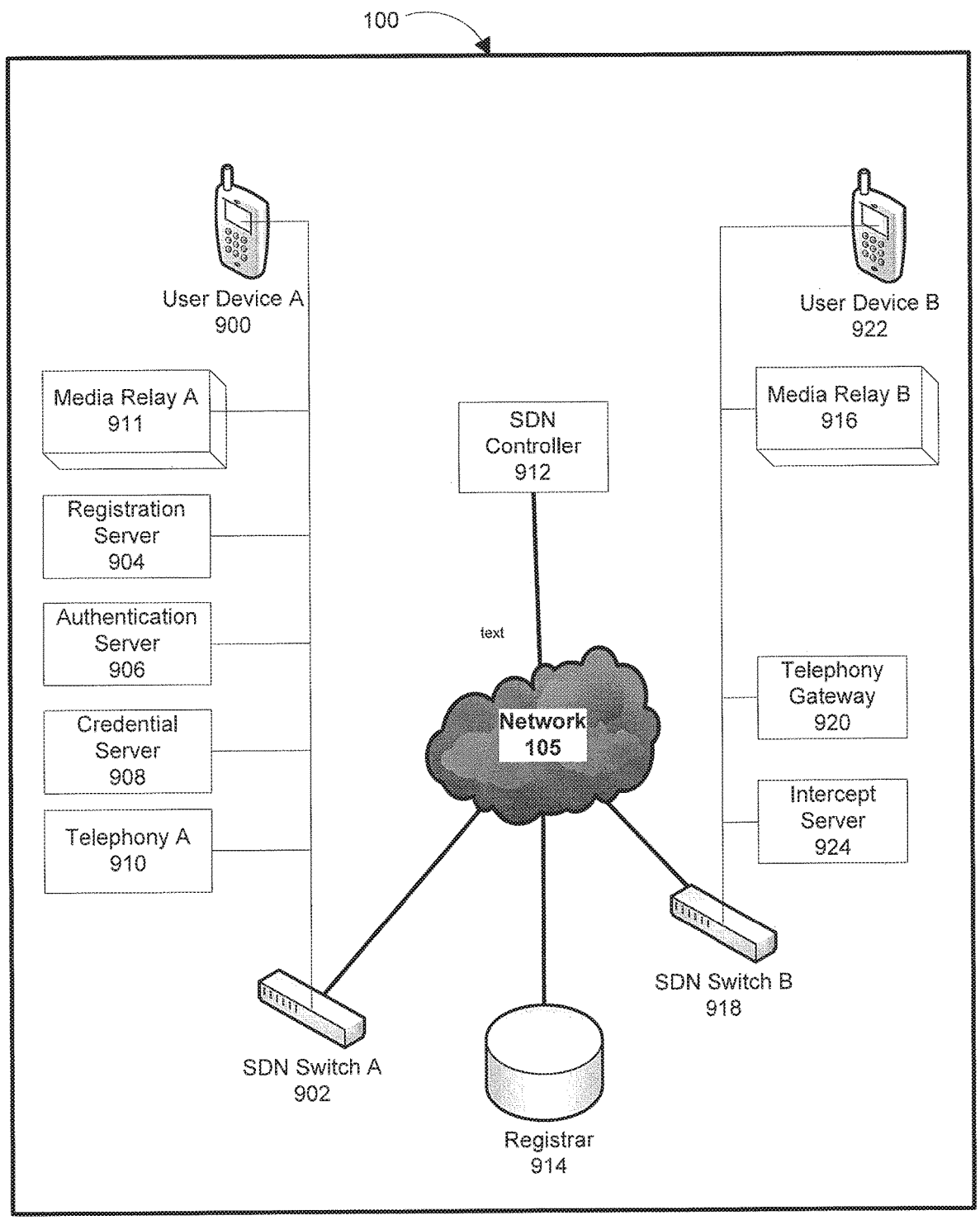
FIG. 1 depicts a communication system, in accordance with an embodiment.

Software Defined Networking (SDN) is used in IMS in order to provide a mechanism to forward (Internet Protocol)

IP packets and provide a simplified solution to the complex signaling path of IMS according to directives from an SDN Controller. Every TO address can be interpreted through an SDN forwarding table which may take into account the FROM address of the packet, as well as the packet type and Type of Service (TOS) bits in the packet header. The TO address is the address of the recipient to which a message is directed to and the FROM address is the address of the message sender. The SDN Controller resolves the TO address based upon an evaluation of all these attributes of the packet. Thus, two packets with the same TO address but with different FROM addresses may be resolved and sent to completely different servers in the network.

This property of SDN can be used by an application and manipulated to arrange for a switch to send packets to the correct server based upon the address of the sender. This SDN property can also be used to send packets of different types from the same sender and with the same TO address to different servers. During the course of communications, by using this SDN property, servers can arrange to change where future packets are sent by the switch in order to reflect changes in session state. In one embodiment, session state is an internal processing state that is understood by a server which requests a forwarding change.

SDN aware telephony servers can manage the flow of packets by making calls upon the SDN Controller to change the way IP traffic flows through the network. This can substantially simplify the design of the IMS implementation so that fewer servers are required and signaling messages are passed directly to the application server with no intermediate hops. Once the set of application servers associated with a user is discovered, SDN chaining can be used to ensure that every signaling packet flows through the correct application servers and every media packet flows through the correct media servers. The addresses of media servers can be remapped through SDN so that the connection addresses found in the signaling packets can be left unchanged from server to server and the media packets will simply flow to the correct relay point.

As described herein, SDN is used in at least three particular scenarios. In the first scenario, communications are simplified using SDN directed signaling disaggregation. In this scenario, different server types serve different client states. Each server fulfills a function then uses SDN to assign the client to a new server type. One server does not need to support different states for different clients so each session is stateless. Sever instances may be load balanced by type since no per client memory is required. Each client uses only a single server address and any switch will forward traffic to the correct server as client messages move through the network. In one embodiment servers may be localized based upon a session path. In one embodiment, servers are allocated as shared components on some basis such as per conference, across sessions, by location, etc.

In the second scenario, SDN is used to direct media function chaining. In one embodiment, the system design is optimized for modular media processing across services. Any switch can execute media chaining as media paths are established by an application. Servers can be instantiated at session establishment and chained via SDN service chaining. In one embodiment, a media path is established only when a session is created and media paths vary according to the needs of a session. For example, transcoding for a session is provided only when necessary. In one embodiment, media paths are torn down when the session ends.

In the third scenario, the system can be used as an SDN based media relay. In this scenario, a P-CSCF can instantiate a relay virtual network function (VNF) per conversation. SDN can be used to map traffic from one device addressed to a second device through a relay service. Session control messages can be passed back and forth unchanged thereby reducing session overhead and no processing is required per message once a session is established. The details of each scenario and implementations according to various embodiments are described below.

FIG. 1 depicts a communication system, in accordance with an embodiment. Communication system 100 includes a user device A 900, a network 105, and a user device B 922. Communication system 100 also includes the following network elements: SDN Switch A 902, Registration 904, Authentication 906, Credentials 908, Telephony A 910, Registrar 914, Media Relay (M.R.) B 916, Telephony GW 920, SDN Controller 912, SDN Switch B 918, Call Intercept (Int.) 924, and M.R. A 911. In an embodiment, each of these network elements may be servers. User devices A and B represent user devices employed by user A and user B, respectively. Communication system 100 may include fewer or additional users than those depicted in FIG. 1.

In the exemplary embodiment of FIG. 1, network 105 is any network which incorporates SDN enabled switches. In other embodiments, network 105 may include one or more of a number of different types of networks, such as, for example, the Internet, a virtual private network (VPN) over the Internet. Other networks may be used. Alternatively, network 105 may include a combination of different types of networks. For example, an intranet, a local area network (LAN), a wide area network (WAN), a wireless network, a Fiber Channel-based storage area network (SAN), or Ethernet may be used.

User device A 900 or user device B 922 may also be connected to a mobile communications network. User device A and user device B may be mobile communication devices. User device A 900 or user device B 922 may have a respective display screen for displaying information. For example, user device A 900 or user device B 922 may be a personal computer, a laptop computer, a workstation, a mainframe computer, a wireless phone, a smartphone, a personal digital assistant, cellular device, a laptop computer, a netbook, a tablet device, a wearable device, etc. Other devices may be used.

User device A and user device B may be connected to network 105 through a directed (wired) link, or wirelessly.

Figure 2:
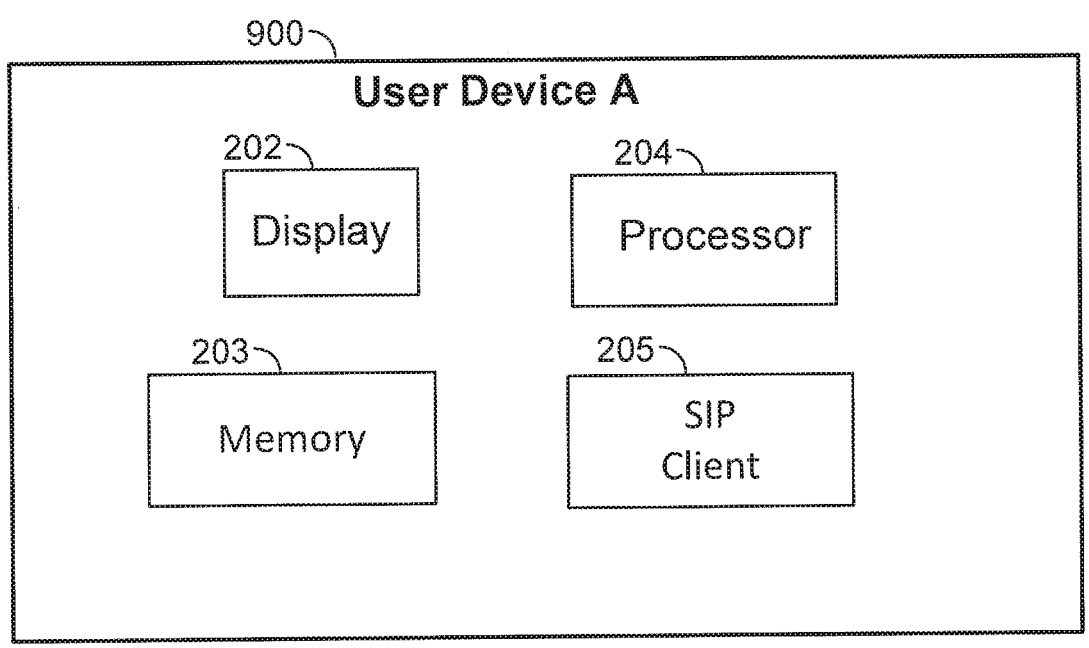
FIG. 2 depicts functional and structural components of an exemplary user device, in accordance with an embodiment.

FIG. 2 depicts functional and structural components of an exemplary user device, in accordance with an embodiment. User device A 900 includes a display 202, a memory 203, a processor 204, and a Session Initiation Protocol (SIP) client 205.

Although FIG. 2 depicts user device A 900, user device B 922 may include similar components to those shown in FIG. 2.

Figure 3:
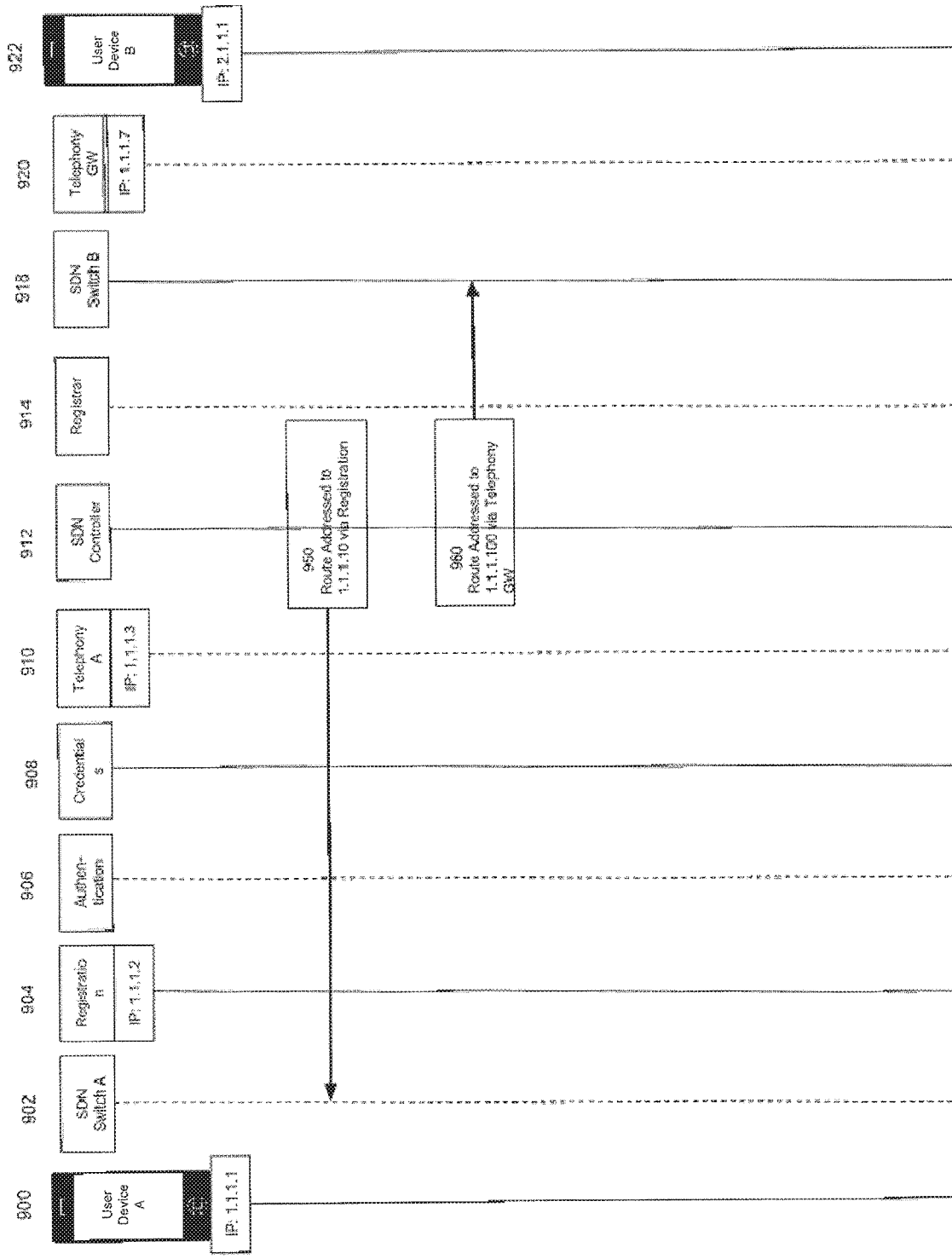
FIG. 3 depicts a message flow of an unregistered device, in accordance with an embodiment.

FIG. 3 depicts a message flow of an unregistered device, in accordance with an embodiment. Specifically, messages flow between the network elements depicted in FIG. 3. FIG. 3 includes the following network elements: user device A 900, SDN Switch A 902, Registration Server 904, Authentication Server 906, Credentials Server 908, Telephony A 910 (e.g., a Telephony Server), SDN Controller 912, Registrar 914, SDN Switch B 918, Telephony Gateway (GW) Server 920, and user device B 922. In the depicted embodiment of FIG. 3, user device A 900 is a user device that has an IP address of 1.1.1.1. User device B 922 is a user device that has an IP address of 2.1.1.1. Registration Server 904 has an IP address of 1.1.1.2. Telephony A 910 has an IP address of 1.1.1.3. Telephony GW 920 has an IP address of 1.1.1.7. These IP addresses are shown for exemplary purposes only and these devices may each be assigned any IP address. In an embodiment, SDN Switch A 902 and SDN Switch B 918 are network switches. SDN Switch A 902 and SDN Switch B 918 do not initiate traffic or terminate traffic. Packets are forwarded through these switches and their functionality is only to examine packet headers and determine where to send the packet next. In SDN, this forwarding is performed using dynamic forwarding rules. In conventional IP switches, forwarding is performed using a fixed forwarding algorithm. SDN Switch A and SDN Switch B may include several forwarding rules. These rules include, for example, time-out rules (e.g., time-to-live) that indicate when a session with a particular user device is to time-out after a period of inactivity. In an embodiment, any signaling that occurs between the user device and the SDN Switch keeps the rule alive and allows the user device to stay registered and active. Upon a user device timing out, a reregistration may be required (details described below).

Suppose that user device A 900 is unregistered. In other words, suppose that user device A 900 is unknown to Registration Server 904 and SDN Controller 912 has been given no special forwarding rules for packets coming from or going to user device A 900. SIP client 205 of user device A 900 is configured to interact with an IMS system having an IP address of 1.1.1.10. Because user device A 900 is unregistered, a forwarding table stored on SDN Controller 912 is initialized to forward messages (i.e., in the form of IP packets) addressed to IP address 1.1.1.10 from any external address to Registration Server 904 (having an IP address of 1.1.1.2). SDN Controller 912 communicates with SDN Switch A 902, via message 950, to inform SDN Switch A 902 that IP packets addressed to IP address 1.1.1.10 are to be forwarded to Registration Server 904. The forwarding table on SDN Controller 912 is also initialized to forward IP packets that form message 960 addressed to IP address 1.1.1.100 via Telephony Gateway 920 (having an IP address of 1.1.1.7). SDN Controller 912 communicates with SDN Switch B 918 to inform SDN Switch B 918 that IP packets addressed to IP address 1.1.1.100 are to be forwarded via Telephony Gateway 920. SDN Switch A 902 and SDN Switch B 918 will not forward packets, in a situation where a device is unregistered, to any other IP addresses other than IP address 1.1.1.10 (to be forwarded via Registration Server 904) and 1.1.1.100 (to be routed via Telephony Gateway 920) unless forwarding table updates are made. Upon registration of a user device and/or client, forwarding table updates are made by the Registration Server 904. As depicted in FIG. 3, all packets entering the network shown in FIG. 3 are forwarded through either SDN switch A 902 or SDN switch B 918.

Figure 4A:
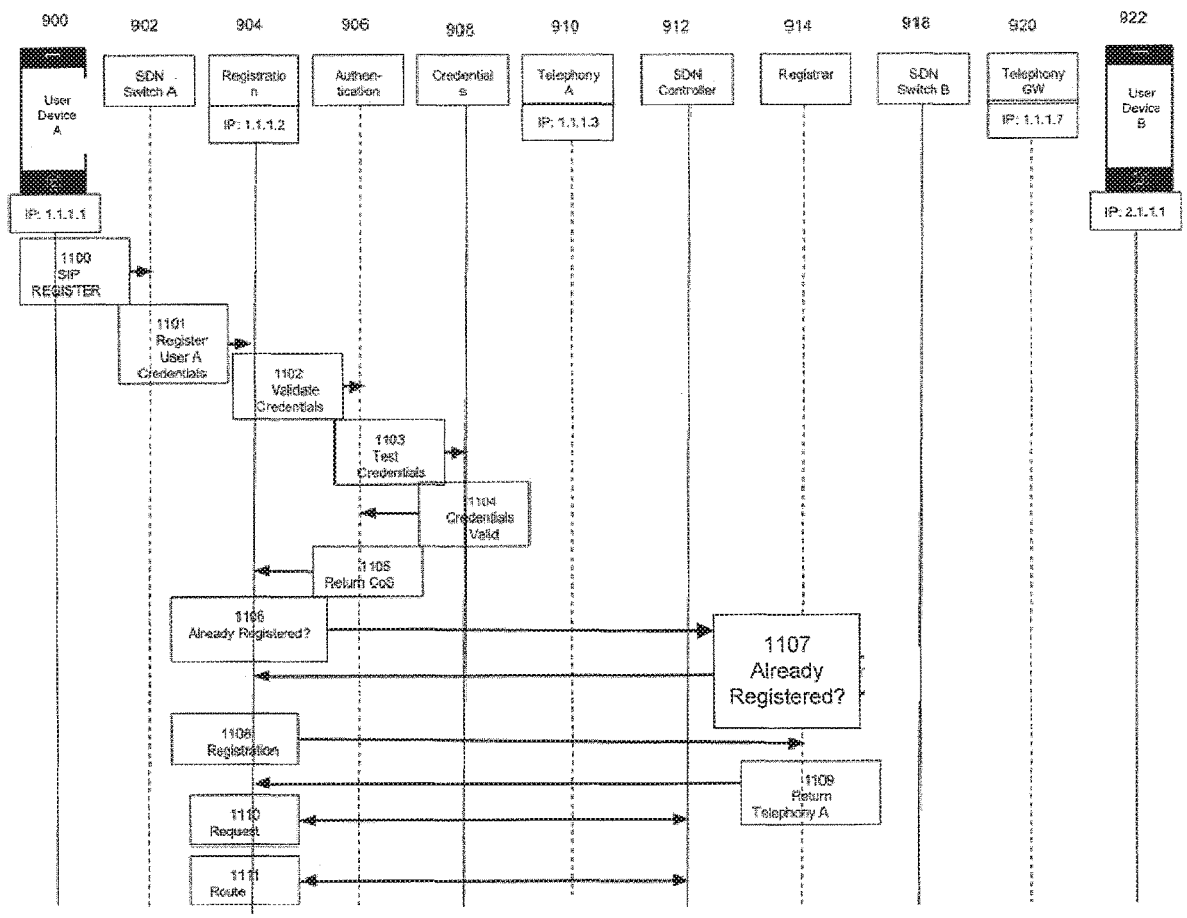
FIG. 4A and FIG. 4B depict a message flow of a registration process, in accordance with an embodiment.

FIG. 4A depicts a message flow of a registration process, in accordance with an embodiment. User device A 900 (an unregistered user device) sends a SIP REGISTER message 1100 addressed to IP address 1.1.1.10. The message includes credentials of user device A 900 including user device A 900's IP address. SDN Switch A 902 receives the SIP REGISTER message 1100. In an embodiment, SIP client 205 of user device A 900 is attempting to register. Credentials include, for example, a form of a user identity (e.g., user name) and an encrypted code to authenticate that identity. Other forms of credentials include a user's contact address, a personal identification number (PIN), a SIP uniform resource identifier (URI) an authentication string such as a challenge responses in which the response is partially an encryption of the challenge using a shared key, a Public Key Infrastructure (PKI) exchange arrangement in which an identity is encrypted with a private key known only to the sender and decrypted by the receiver with a public key associated with that identity, a one-time key which is changed automatically each time it is used (called a one-time pad) or based upon time of day (e.g., such as in the Rivest-Shamir-Adleman (RSA) secure key generation system), etc.

SDN Switch A 902 forwards the SIP REGISTER message to Registration Server 904, as specified in SDN Controller 912's forwarding table to register user device A's credentials (described above). User A's credentials are included within message 1101. It should be noted that, although messages 1100 and 1101 are identified as separate messages, each of messages 1100 and 1101 have the same content (in this case, the credentials in each of messages 1100 and 1101 are the same). Also as described above, the forwarding table in SDN Controller 912 initially forwards all IP packets addressed to IP address 1.1.1.10 from any external address (i.e., from user device A 900), to Registration Server 904.

In an embodiment, Registration Server 904 only handles SIP REGISTER messages. All other messages are rejected.

When Registration Server 904 receives the SIP REGISTER message, credentials are extracted. Registration Server 904 sends the credentials in a credentials message 1102 to the Authentication Server 906 for validation.

Authentication Server 906 receives the credentials for user device A and tests the credentials against provisioned credentials stored at Credential Server 908. The credentials to be tested are a part of message 1103.

Credential Server 908 returns approval of the credentials to Authentication Server 906, via message 1104.

Authentication Server 906 identifies a Class of Service (CoS) associated with user device A's account and returns the CoS value within message 1105 to Registration Server 906.

Registration Server 906 checks the Registrar 914 to see if user A is already registered with a different SIP client instance on a different user device by sending message 1106 to registrar 914. If user A is registered, all clients associated with user A should be handled by a common telephony server, and Registrar 914 informs Registration Server 906 of the address of that server via message 1407. In an embodiment, suppose that user A may use multiple devices which have each registered with a common identity (of user A) from different user devices. Calls received for that user may ring all devices that are registered to user A. The first device to answer will receive the call and ringing of all other devices should stop. In order to coordinate such behavior, it is necessary that session messages are all sent to and from the same telephony server.

If user A is not already registered (as in the depicted embodiment), then a telephony server is assigned which is associated with the CoS to be delivered to user device A (described below). The assignment of the telephony server is communicated from Registrar 914 to Registration 904. A CoS determines which set of rules are used for handling a class of users with a common set of rules.

Registrar 914 determines whether or not user device A is already registered. In response to determining that user device A is not already registered, Registrar 914 informs Registration Server 904, via message 1107, that user device A is not already registered.

Registration Server 904 sends a registration request, via message 1108, to Registrar 914, which includes the IP address of the client (i.e., user device A's IP address: 1.1.1.1).

Registrar 914 stores the IP address of the client of user device A and returns, via message 1109, the IP address of Telephony Server A (i.e., 1.1.1.3) to Registration Server 904. Registrar 914 returns the IP address of Telephony A 910 because it assigns Telephony A 910 to user device A 900. Registrar 914 includes the IP address of multiple telephony servers and can assign them to IP addresses of clients.

Registration Server 904 initiates an SDN forwarding request, via message 1110, to SDN Controller 912 providing an instruction to update SDN forwarding tables so that any packets (e.g., signaling messages) coming from this client of user device A (i.e., FROM IP address 1.1.1.1) to the IMS IP address (having IP address of 1.1.1.10) should be forwarded from this time until the registration is ended to Telephony Server A (having IP address of 1.1.1.3) instead. SDN Controller 912 sends a confirmation message back to Registration Server 904, as shown by the bidirectional arrow. This update to the forwarding table removes extra hops from the signaling path. Signaling messages include SIP messages such as INVITE, ACCEPT, etc.

Registration Server 904 initiates an SDN forwarding request 1111 on SDN Controller 912 providing an instruction to SDN Controller 912 to have all switches forward packets originating from any IP address with a TO address of 1.1.1.1, except for packets from Telephony Server A, to be forwarded instead to Telephony Server A (having IP address of 1.1.1.3). SDN Controller 912 sends a confirmation back to Registration Server 904, as shown by the bidirectional arrow.

Figure 4B:
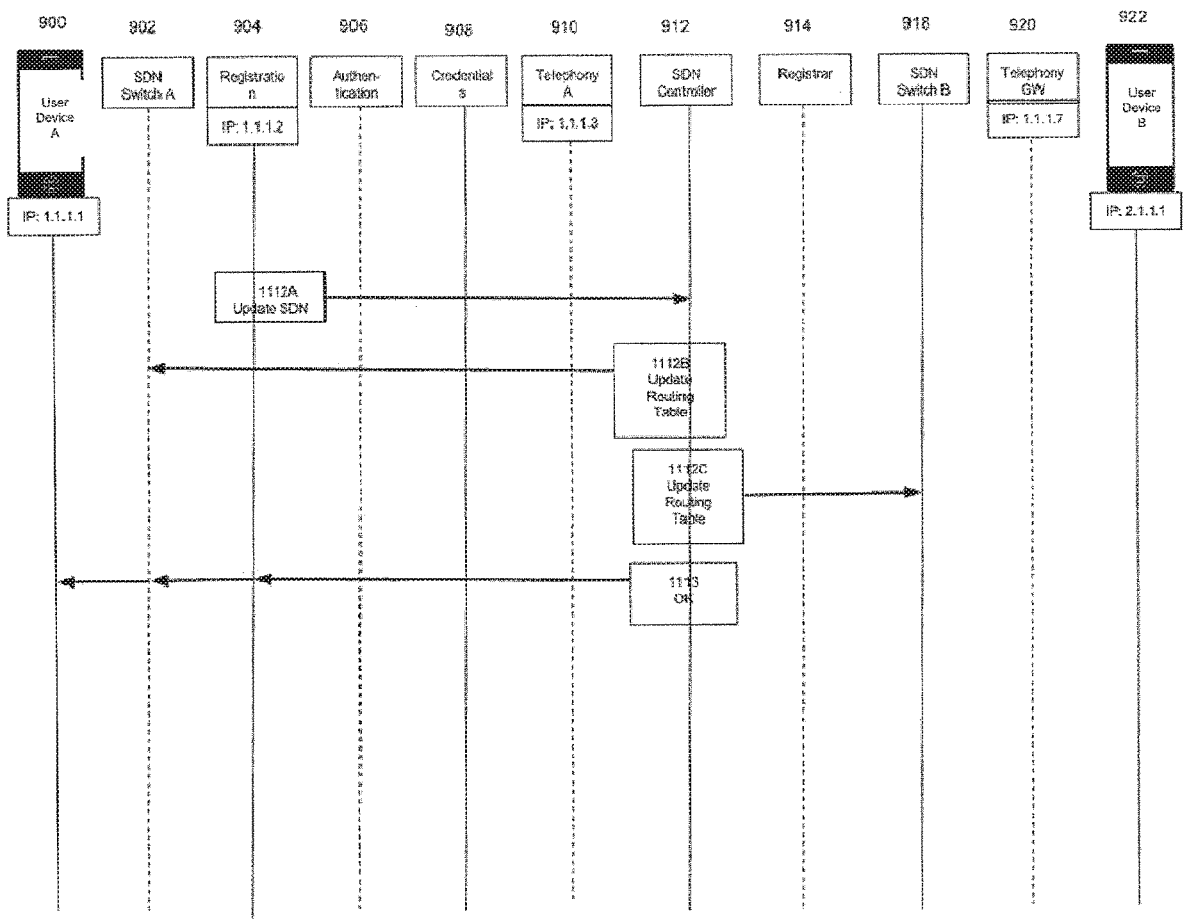

Referring now to FIG. 4B, which is a continuation of FIG. 4A, a message flow of a registration process is shown. Specifically, FIG. 4B is a continuation of the message flow of a registration process and depicts the message exchanges that occur after Registration Server 904 initiates an SDN forwarding request 1111. Registration 904 sends a message 1112A to SDN Controller 912 to update forwarding tables on all the network SDN switches to implement the new forwarding rules described above. SDN Controller 912 communicates with SDN Switch A 902 to inform SDN Switch A 902, via message 1112B, that the forwarding tables have been updated and that IP address 1.1.1.1 (associated with user device A 900) is assigned to telephony A 910. SDN Controller 912 also communicates with SDN Switch B 918, via message 1112C, to inform SDN Switch B 918 that updates to the forwarding tables have been made.

SDN Controller 912 acknowledges that all forwarding table updates have been made in response to message 1112A. Registration Server 904 is informed of this by SDN Controller 912, via message 1113. Registration Server 904 then sends a SIP OK message to user device A 900 indicating that the registration request has been accepted, as shown by the arrows from Registration Server 904 to SDN Switch A 902 which informs user device A 900. In an embodiment, the SIP client in user device A 900 will not attempt to send other SIP requests until the SIP OK message is received.

Figure 5:
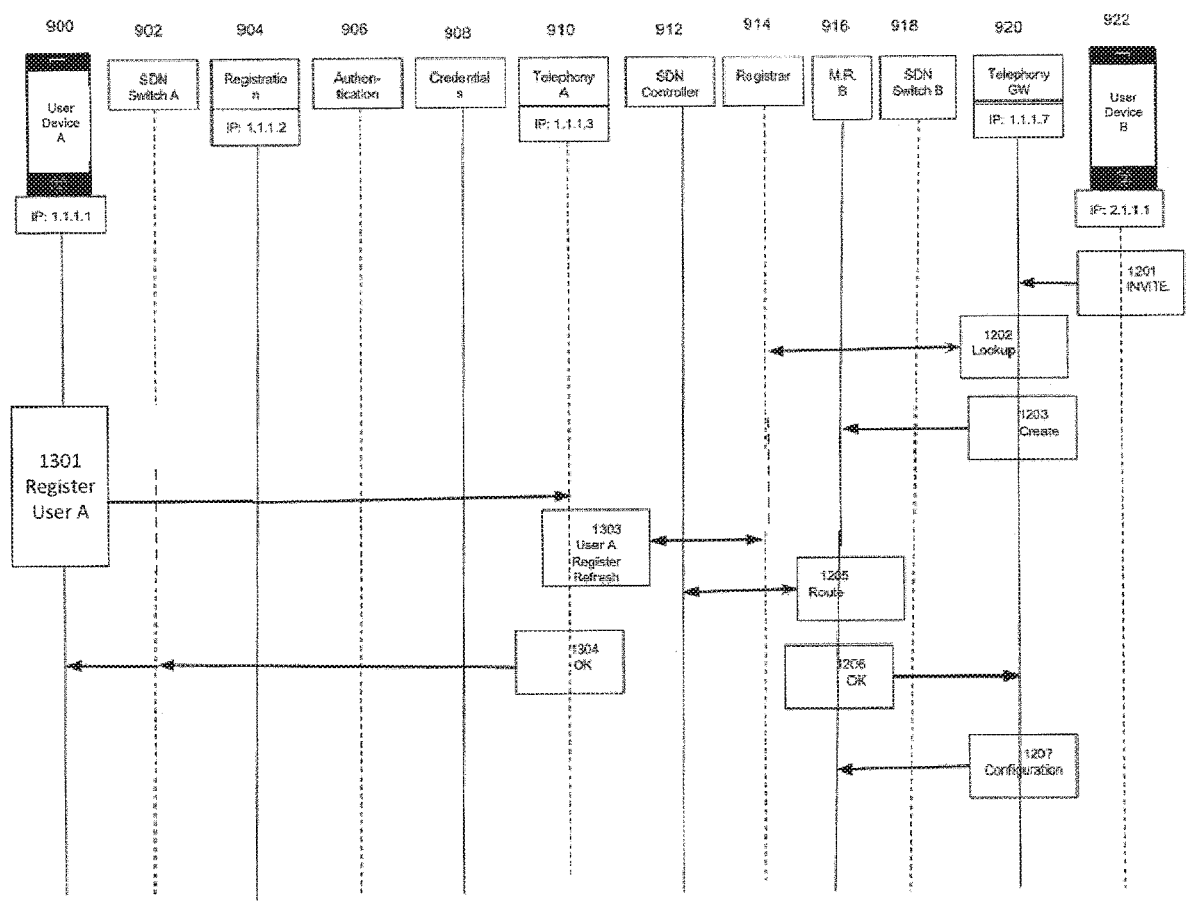
FIG. 5 is a message flow diagram that depicts INVITE forwarding from an external client flow, in accordance with an embodiment.

Referring again to FIG. 4A, once user device A has been added to Registrar 914, SDN switches A and B will send all IP packets with a TO address of 1.1.1.1 (i.e., user device A's IP address) to Telephony A (having an IP address of 1.1.1.3) instead, but only if the packets do not come from/originate from IP address 1.1.1.3. Therefore, IP packets FROM 1.1.1.3 with a TO address of 1.1.1.1 will go to user device A, due to the above-described registration process of user device A. In an embodiment, as long as user device A continues to be registered, the forwarding of the IP packets is performed in the manner described above. FIG. 5 is a message flow diagram that depicts INVITE routing from an external client flow, in accordance with an embodiment. FIG. 5 includes all of the items depicted in the previous figures and also includes an additional component, a Media Relay Server B, depicted as M.R. B 916.

User device B 922 sends an INVITE message 1201. In the depicted embodiment, user device B 922 is an external user. Telephony GW 920 receives the INVITE message. The INVITE message contains the SIP URI of the TO party (user device A 900) and a Session Description Protocol (SDP) payload which identifies the contact address of user device B 922 (i.e., IP address 2.1.1.1).

Telephony GW 920 checks Registrar 914, via message 1202, to see if user device A is online and if so, at what address (i.e., IP address) so that the INVITE message can be sent accordingly. Registrar 914 returns a response, as shown by the bidirectional arrow, indicating that user device A is online (and able to accept phone calls, messages, etc.) and user device A's IP address.

Media Relay Server M.R. B 916 is a network device which is capable of receiving a stream of IP packets representing encoded segments of audio, video or other media types. M.R. B 916 processes the stream of packets in a particular way and sends the processed packets out again. In the embodiment separate media streams passing through M.R. B 915 are distinguished by assigning different ports M.R. B 916 to different streams.

Telephony GW 920 creates a Media Relay port for the media contact address of user device B in the INVITE message. A message 1203 that includes instructions to create the Media Relay port are sent to M.R. B 916 which has been created/instantiated for user device B 922 and is assigned IP address 1.1.1.5. M.R. B 916 is sent the SDP data from the INVITE message.

M.R. B 916 then extracts contact information from the SDP payload of the SIP INVITE message. The contact information includes the media contact address of user device B and information on the formats of supported media options such as the media name, whether the media is send-only (sendonly), receive-only (recvonly) or send and receive (sendrecv), the codec used, the encryption used, the bandwidth, the sampling rate, the protocol, and the ports and IP addresses which handle the media of each type.

M.R. B 916 then takes the contact information from user device B's SDP, and submits forwarding table configuration instructions to SDN Controller 912, via message 1205. SDN Controller 912 is instructed to set forwarding tables to map each IP address/port combination to a port on M.R. B 916. This is performed in order to substitute appropriate ports on Media Relay B for the ports specified in the SDP. A confirmation is sent from SDN Controller 912 to M.R. B 916, as shown by the bidirectional arrow. This eliminates the need in IMS for constant substitution of SDP contents as signaling packets are exchanged.

The processing of the SIP messages is thus simplified by using SDN to re-route media packets addressed to the addresses specified in the two SDP messages to the servers that will process (e.g., relay, intercept, transcode, etc.) those media packets.

In an embodiment, without SDN, the SDP would have to be changed to alter the contact addresses on the current and all future messages. By altering the forwarding of those addresses in the network using the forwarding tables, the SIP messages can be passed through unchanged.

M.R. B 916 confirms the setup for user device B 922 by sending message 1206 to Telephony GW. Telephony GW 920 determines whether additional capabilities are needed for the telephone call between user device B 922 and user device A 900. For example, it may be determined that an intercept to all external calls from user device B 922 is required. Telephony Gateway 920 then starts a new media recorder function for the intercept. In an embodiment, the intercept is performed under legal constraints (e.g., as set by a regulatory or governing body such as a government agency or court). Therefore, the intercept is a lawful intercept.

Telephony GW 920 sends a forwarding table configuration instruction, via message 1207, to "chain" media packets going to or from M.R. B 916 through an intercept function using the process of Service Chaining. Service Chaining is an SDN feature which allows dynamic steering of packet traffic coming out of a Network Gateway through a series of service points (servers) before reaching the destination designated by the TO address in the packet headers. Service Chaining in SDN modularizes individual media processing steps so that virtual media servers can be used and instantiated when required instead of large dedicated hardware installations for media processing.

Suppose that at some point in time, user device A 900 needs to re-register its credentials. For example, user device A 900 may have timed-out, reconnected, changed locations, etc. In another embodiment, user device A 900 may need to re-register after a preset time interval is surpassed. In order to ensure that user device A 900 continues to be connected to the system, re-registration must be performed. Note that the occurrence of the re-registration in FIG. 5 is shown for exemplary purposes only and that it may occur at any time. In an embodiment, re-registration may occur at 5 minute intervals and Telephony A Server 910 will de-register user device A 900 if several re-registration intervals pass without a successful REGISTER message being received. This may happen at any time or multiple times.

User device A 900 sends one such re-register request via SDN Switch A 902, in message 1301, to Telephony A 910 to register user device A.

Telephony A 910 updates the registration time and sends it to Registrar 914, via message 1303. An acknowledgment is sent by Registrar 914 to Telephony A 910, as shown by the bidirectional arrow. In an embodiment, except for updating the Registrar, the re-register request has no other effect.

An acknowledgement is sent from Telephony A 910 to user device A 900, via SDN Switch A 902, in message 1304, indicating that that the Registrar has been updated.

Figure 6:
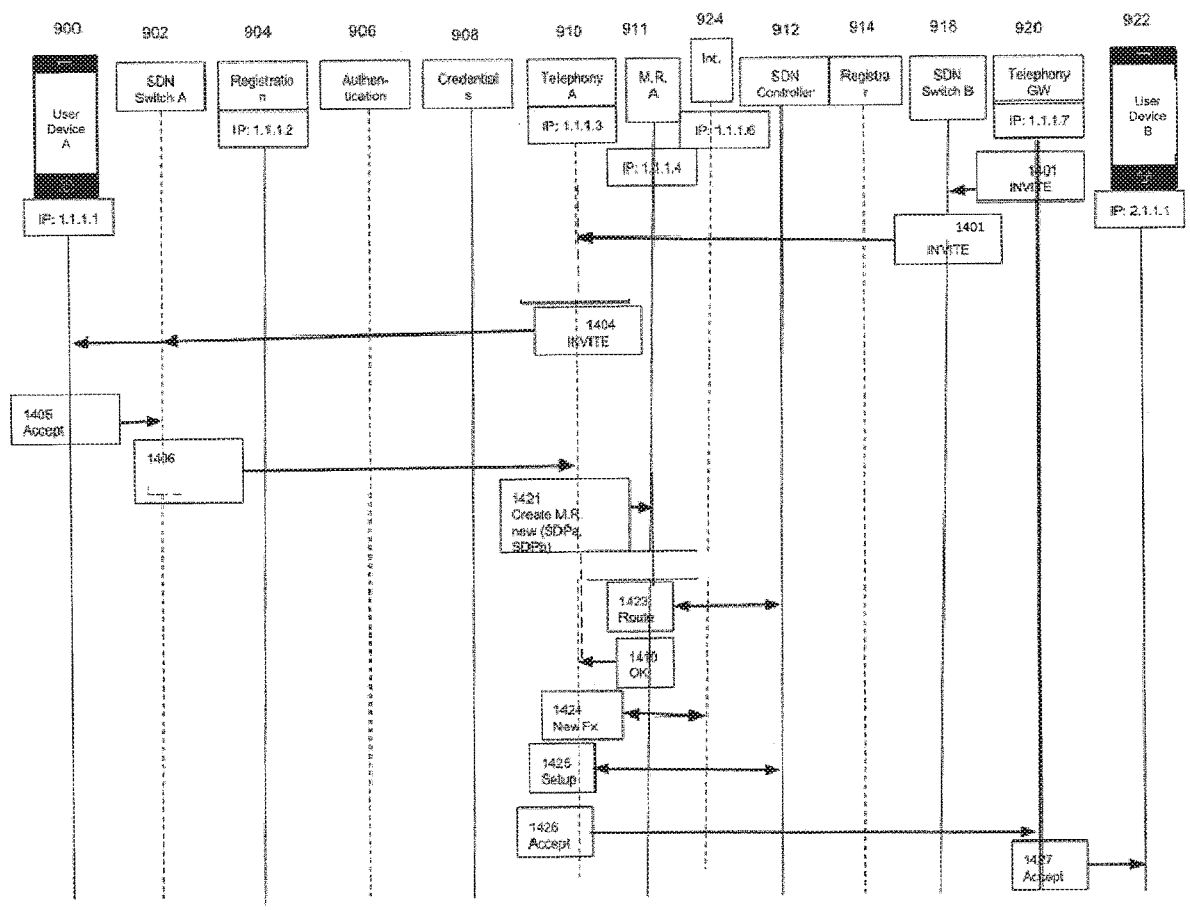
FIG. 6 depicts a termination processing flow, in accordance with an embodiment.

FIG. 6 depicts a termination processing flow, in accordance with an embodiment. FIG. 6 includes all of the items depicted in FIGS. 3, 4A, and 4B and also includes two additional components, a Media Relay Server A, depicted as M.R. A 911 and Call Intercept "Int." 924. After configuring the media path for traffic to and from user device B 922, Telephony GW 920 is ready to pass the request into termination processing functions for user device A 900 (the receiver of the INVITE). These termination processing functions may include modal decisions such as whether user device A is set to a "Do Not Disturb" mode or whether user A's calls are being forwarded to a different user or may involve transitory decisions such as what should be done if user A does not answer a call.

Telephony GW 920 receives an INVITE message 1401 from user device B 922 directed to user device A 900 and forwards the INVITE message to user device A 900 (e.g. to IP address 1.1.1.1) through the sender's SDN switch, SDN Switch B 918. As user device A is registered and all messages are to be forwarded to user device A via Telephony A 910 (as per the routing rules set upon registration of user device A), SDN Switch B 918 forwards the INVITE message to Telephony A 910.

Recall that all messages with a TO address of IP address 1.1.1.1 are forwarded by SDN Switch B 918 to Telephony A 910 (having an IP address of 1.1.1.3), as instructed by the SDN forwarding table rules described above with respect to FIG. 4A. The INVITE message 1401 is forwarded by SDN Switch B 918 to Telephony A 910. As described above, in an embodiment, SDN Switch B (similar to SDN Switch A) is a network switch that forwards packets. Therefore, any messages that pass through SDN Switch B emerge unchanged.

Telephony A 910 provides processing of inbound (termination) rules for user device A 900 such as call forwarding, do not disturb, etc. before sending the INVITE message to its final destination. The processing of inbound (termination) rules is performed by Telephony A 910 upon receiving INVITE message 1401 and prior to sending out INVITE message 1404.

Based on the processing, telephony A 910 generates a new INVITE message 1404 which is sent to user device A 900 via SDN Switch A 902, as shown by the respective arrows.

The receipt of the INVITE message by user device A 900 will usually result in an alert to the user employing user device A 900. The alert might be in the form of ringing or another alert. As in the depicted embodiment, if the user picks up the receiver, an ACCEPT message will be sent by user device A to IP address 1.1.1.10, via SDN Switch A 902. The ACCEPT message 1405 has an SDP payload containing the media types that user device A 900 can receive (from amongst those media types offered in the INVITE message) and the IP addresses and IP ports which may be used for contact with user device A 900. This information is designated as SDPa.

SDN Switch A 902 forwards all messages from user device A 900 addressed to IP address 1.1.1.10 to Telephony A 910 (having IP address 1.1.1.3). Specifically, as shown in FIG. 6, SDN Switch A 902 forwards message 1406 to Telephony A 910.

In order to setup media relay handling for user device A 900, the following messages are exchanged. This process is similar to the setup of M.R. B 916 in FIG. 5.

Telephony A 910 creates message 1421 that includes a media relay port for the media contact address, specified by SDPa, in the ACCEPT message 1405. M.R. A 911 is instantiated for user device A 900 and is assigned IP address 1.1.1.4 to provide media relay services. M.R. A 911 is sent the SDP data from the INVITE message (SDPb) as well as the ACCEPT message (SDPa). SDPb contains the client contact information for client B (i.e., user device B) which is contained in the INVITE message and was retained by Telephony A when it passed the INVITE to user device A. SDPa contains the client contact information for client A (i.e., user device A) which is contained in the ACCEPT.

M.R. A 911 extracts contact information from the SDP payload of the SIP ACCEPT message upon receiving message 1421. Contact information includes information on the formats of supported media options (audio, video, etc.) and the ports and IP addresses, which handle the media of each type.

M.R. A 911 takes the contact information from user device A's SDP (SDPa) and submits forwarding table configuration instructions, via message 1423, to SDN Controller 912 to map each IP address/port combination to a port on M.R. A 911. SDN Controller 912 returns a confirmation back to M.R. A 911, as shown by the bidirectional arrow.

M.R. A 911 sends an OK confirmation message 1410 to Telephony A 910.

It is determined by Telephony A 910 that a new media interception function is needed, and Int. 924 (having an IP address of 1.1.16) is created/instantiated. In an embodiment, Int. 924 is only created/instantiated when needed. In this way, resources for implementing Int. 924 are utilized only when necessary.

In an embodiment, Int. 924 may be created if a particular media processing service (e.g., recording or a wiretap of a telephone conversation) is needed. For example, the SDN Controller may receive a request along with the SDPb that states that a recording or wiretap of the telephone call involving user device B is needed. To set up the recording of the telephone call, Int. 924 needs to be set up and instantiated on-demand based on the request received via message 1424. In another embodiment, until Int. 924 is needed, it is not set up. In another embodiment, other types of capabilities may be needed to operate on the media streams during a call besides wiretap. For example, it may be necessary to transcode audio from one codec, such as an Adaptive Multi-Rate (AMR)-Wideband to another, such as OPUS or it may be necessary to convert out-of-band dual-tone multi-frequency signaling (DTMF) signals into audible tones injected into the media stream, etc. In case of these other types of capabilities, additional media processing units may be instantiated and added to the service chain in the same way as Int. 924.

In an embodiment, network elements such as M.R. A 911, M.R. B 916, Int. 924 are referred to as media processing servers that each provide media processing services. Media processing services may comprise call intercept, conversion, and/or enhancement, etc. Additional media processing services may be provided by these elements (or other elements). Additional media processing services include transcoding when a codec is available to user device A that is not compatible with a codec available to user device B. Another example of media processing services include media bridges which allow multipoint calls when more than two endpoints are connected to the same conversation at the same time. In IMS systems, these media bridges may include one bridge for mixing audio and another for selectively forwarding video.

The forwarding of media packets via Int. 924 is communicated, via message 1425, from Telephony A 910 to SDN Controller 912.

The ACCEPT message 1426 with an SDP payload is sent from Telephony A to Telephony GW 920.

The ACCEPT message is forwarded, via message 1427, from Telephony GW 920 to user device B 922. During the call, the SDN switches forward media packets to Int. 924 which records the call by storing a copy of every packet.

Figure 7:
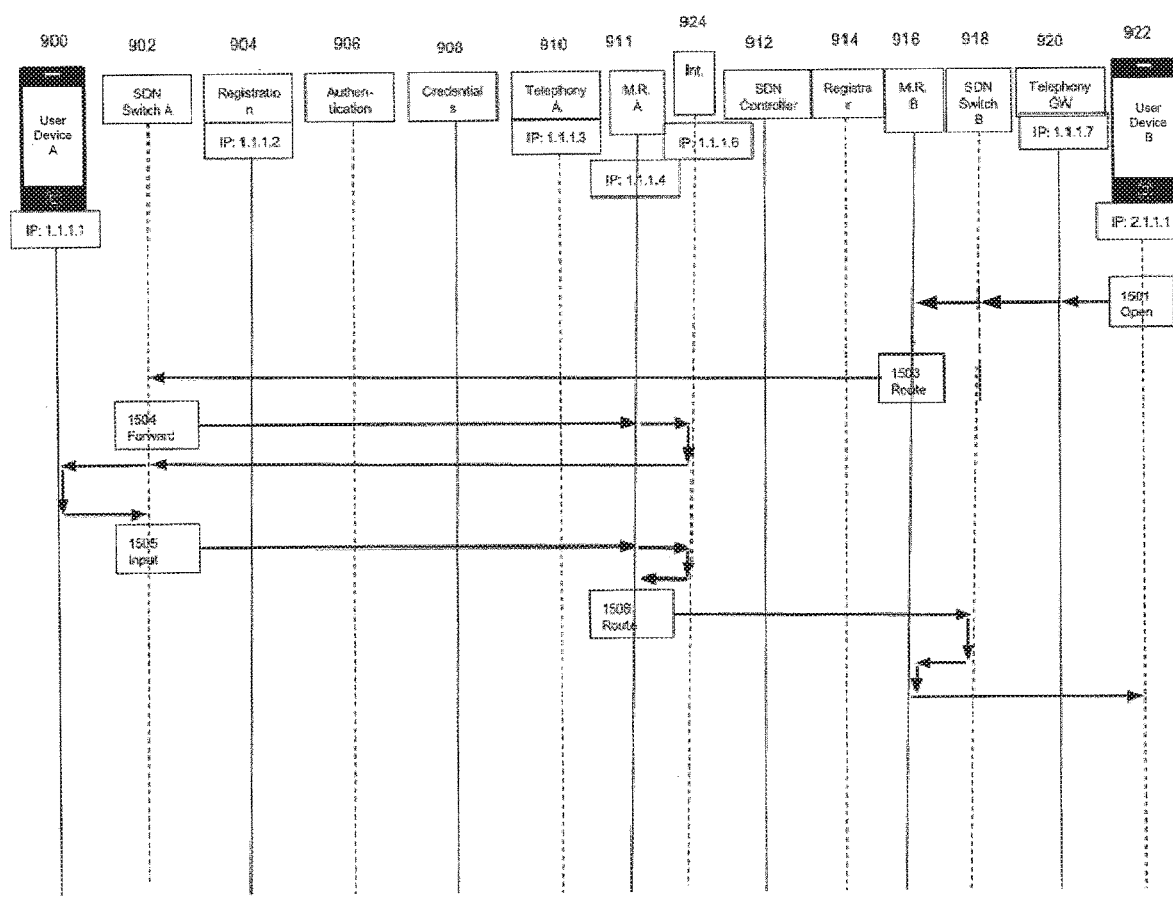
FIG. 7 depicts media flows between two clients, in accordance with an embodiment.

FIG. 7 depicts media flows between two clients, in accordance with an embodiment. Specifically, FIG. 7 shows media flows between two clients using the media relays and other media functions based upon the SDN configuration, which has been negotiated in previous FIGS. 3, 4A, 4B, 5, and 6. Because SDN forwarding tables have been configured, there is no need to maintain forwarding information in the various relay functions. Media is addressed by each user client (i.e., user device A 900 and user device B 922) to the IP address of the other user client and the SDN switches direct the media to the appropriate relay and other special processing (e.g., Int. 924) points as configured in previous FIGS. 3, 4A, 4B, 5, and 6.

User device B 922 having received the contact information in SDPa opens the contact address sent by user device A 900, via message 1501, which is an open ( ) request message. In the depicted embodiment, that address is a Real-time Transport Protocol (RTP) media port (port 1) at IP address 1.1.1.1. The open request is sent from user device B 922 to port 1 on IP address 1.1.1.1, via SDN Switch B 918.

SDN Switch B 918 has been configured to forward requests from user device B's address (IP address 2.1.1.1, port 1) with a TO address of 1.1.1.1:1 to M.R. B 916 (having IP address of 1.1.1.5) instead. Once user device B 922 has successfully opened the media port on M.R. B 916, user device B will send Real-time Transport Protocol (RTP) media to that port. In an embodiment, SDN Switch B 918 is configured to reject a request to open 1.1.1.1:1 unless it comes from 2.1.1.1:1.

M.R. B 916 relays the media, via message 1503, on to the client (user device A 900) using SDN switch A 902. But the forwarding table tells the switch to forward any media packets addressed to user device A 900 (IP address 1.1.1.1, port 1) to M.R. A 911 instead.

M.R. A 911 forwards the packets on to user device A's address, via message 1503, but because of a chaining rule at SDN Switch A 902, the packets are sent to Int. 924 which is used to play the media for a provisioned listener where it may be recorded. Then the media is sent on to user device A 900.

Media sent from user device A 900 also goes to SDN Switch A where an SDN provisioned forwarding rule tells the switch to send all media packets from IP address 1.1.1.1 port 1 to M.R. A 911, via message 1505. M.R. A 911 will forward the packets on to user device B 922 but through service chaining rules the media from user device A 900 will first be sent to the Int. 924 before being sent on.

Another SDN switch will see that packets addressed to user device B 922 sent from user device A 900 should be sent to M.R. B 916. From M.R. B 916 the packets may be sent on to user device B 922, via message 1506.

In an embodiment (not depicted), at any point, a SIP BYE message may be received from either user device A 900 or user device B 922. The SIP BYE message will arrive at Telephony A 910, which is responsible for shutting down the session. In order to do this, SDN instructions are sent to the SDN Controller instructing the SDN Controller to remove the media forwarding rules, which allow the forwarding of media packets between user device A 900 and user device B 922. After these instructions are issued, no media packets will reach either media relay server (M.R. A 911 or M.R. B 916) and all media communications between the two clients are terminated.

Figure 8:
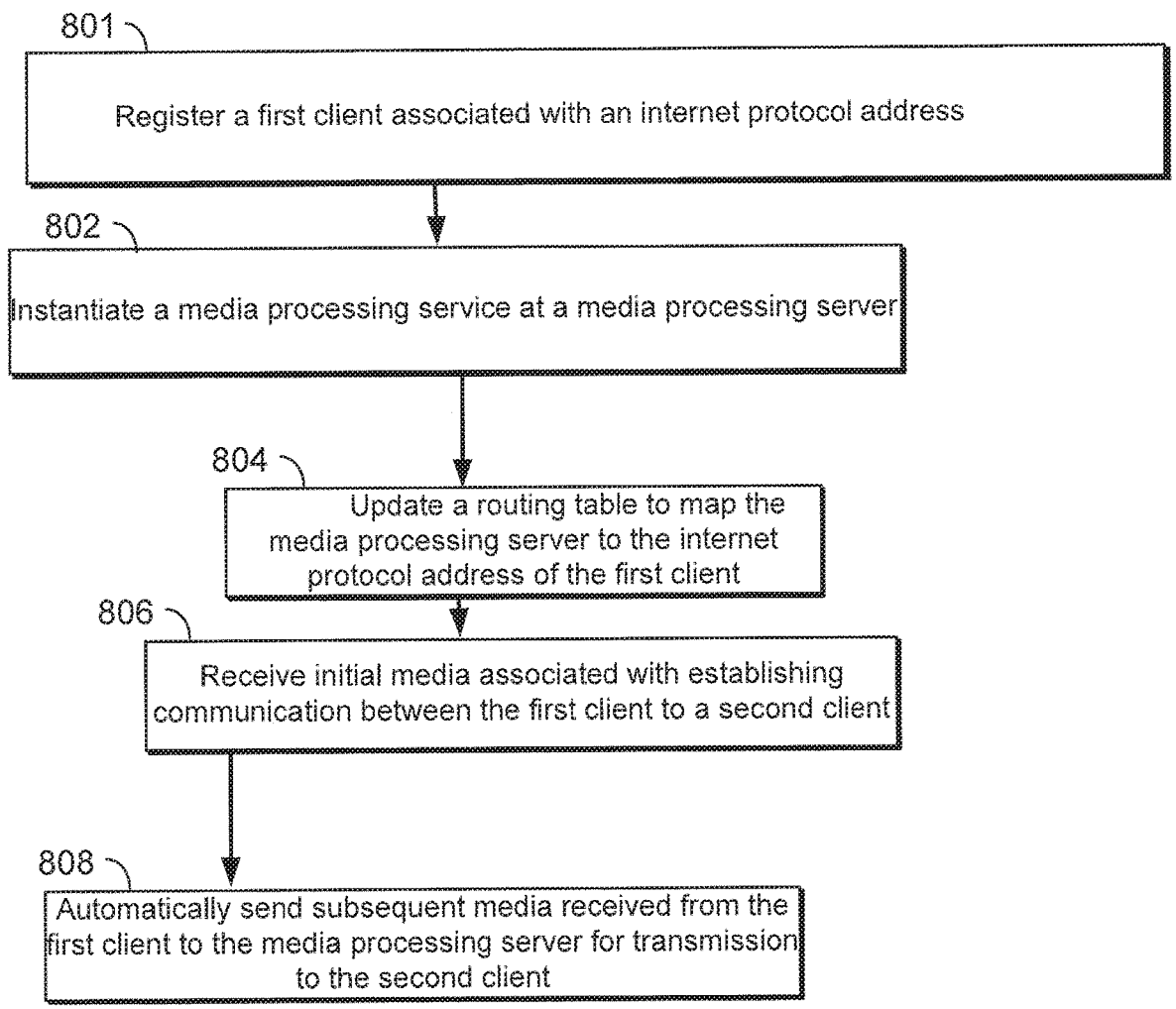
FIG. 8 is a flowchart of forwarding media, in accordance with an embodiment.

FIG. 8 is a flowchart of forwarding media, in accordance with an embodiment. At step 801, a first client associated with an IP address is registered. A SIP client of user device B 922 registers in a manner similar to the manner described above with respect to FIG. 4A. Specifically, as descried with respect to FIG. 4A, messages 1100-1108 are exchanged. As described in FIG. 6, a session establishment message is an INVITE message 1401 used to invite user device A 900 to communicate with user device B 922. In another embodiment session establishment may include different data. Similarly, for user device B 922 to communicate with user device A 900, an INVITE message is sent.

Referring again to FIG. 8, at step 802, a media processing service is instantiated at a media processing server. A media relay port to provide a media processing service is instantiated at M.R. B 916, as described above with respect to message 1203 in FIG. 6. Referring again to FIG. 8, at step 804, a forwarding table to map the media processing server to the internet protocol address of the first client is updated.

The forwarding table stored on SDN Controller 912 is updated to map M.R. B 922 to the IP address of user device B 922 (i.e., 2.1.1.1).

At step 806, initial media associated with establishing communication between the first client to a second client is received. As shown in FIG. 7, initial media (i.e., message 1501 which is an open request message) is received by M.R. B 916.

Media handling services are established to operate upon media sent between user device A 900 and user device B 922. As described in FIG. 5 messages 1203-1207, and FIG. 6 messages 1421-1425 are used to establish processing steps for handling media between user device A 900 and user device B 922. In another embodiment, media handling services may include different data and may utilize different media processing services.

The initial media is sent to SDN Switch A 902 as message 1503, as described above with respect to FIG. 7.

At step 808, subsequent media received from the first client (i.e., user device B 922) is automatically sent to the media processing server (i.e., M.R. B 916) which then sends the media on to the second client, user device A 900. SDN Switch B 918 sends any media received from user device B 922 that is addressed to user device A 900 to M.R. B 916 and finally to M.R. A 911 for transmission to user device A 900. This is because all FROM messages from the media port of user device B 916 are forwarded via M.R. B 916 based on the forwarding table mappings contained in SDN Controller 912.

In an embodiment, the media processing server (M.R. B 916) receives a stream of packets representing encoded segments of audio, video or other media types.

In an embodiment, the establishing communication between the first client to the second client in step 804 of FIG. 8 comprises establishing a telephone call. The telephone call may be a call placed over a mobile communications network, be in the form of a Voice Over IP (VoIP) call, etc. Telephony GW determines that a media processing service is required for the telephone call and sets up Int. 924. Int. 924 is then instantiated, where it is required for the telephone call between the user clients.

In an embodiment (not depicted), suppose that the telephone call between user device B and user device A is terminated and a third user client, user device C wishes to establish a second telephone call between user device C and user device B. User device C sends an INVITE message to Telephony GW 920. The INVITE message contains the SIP uniform resource identifier (URI) of the TO party (user device B 922) and a Session Description Protocol (SDP) payload which identifies the contact address of user device C.

In order to create a Media Relay port and a Media Relay C (M.R. C) for user device C, messages are exchanged that are similar to messages 1202-1207 described above with respect to FIG. 5. Messages 1202-1207 described above are used for user device B. Similar messages are exchanged for user device C.

M.R. C is created for user device C and is assigned a particular IP address.

M.R. C confirms the setup for user device C, and Telephony GW 920 determines whether additional capabilities are needed for the telephone call between user device B and user device C. In an embodiment, Telephony GW determines that no additional capabilities are needed for the telephone call.

Telephony GW 920 receives then forwards an INVITE message to user device B 922 (e.g. to IP address 2.1.1.1)

through the Telephony GW's SDN switch, SDN Switch B and onwards. Telephony GW 920 sends all IP packets through SDN Switch B 918. These message exchanges are similar to the exchanges of messages 1401-1406 in FIG. 6.

In order to setup media relay handling for user device B 922, messages similar to messages 1421, 1423, and 1410 in FIG. 6 are created/exchanged.

The ACCEPT message from user device B is sent to Telephony GW 920. Therefore, Telephony GW 920 receives the ACCEPT message from the first client (i.e., user device B). Telephony GW 920 determines that no additional media processing service is required and therefore, no additional functionality and/or instantiation is necessary.

Media can then be sent from user device C to M.R. C for delivery to user device B.

In an embodiment, the forwarding table stored on SDN Controller 912 is updated when user device C registers. The forwarding table may be updated each time a client registers or unregisters.

In an embodiment, SDN Controller 912 can utilize one or multiple protocols to affect a flow of packets (i.e., contained within messages) from a source (e.g., user device A 900, user device B 922, etc.) to a telephony server (e.g., Telephony A 910, etc.). In other words, SDN Controller 912 can change packet headers of the packets so that the packets are sent out to the appropriate server.

In an embodiment, SDN Controller 912 instructs SDN Switch A and SDN Switch B to re-write packet headers using OpenFlow. In another embodiment, in order to re-write packet headers, SDN Controller 912 can utilize Multiprotocol Label Switching (MPLS) tags or set a Border Gateway Protocol (BGP)-Flow Specification entry to an SDN Switch in order to provide instructions for how the flows of packets are to be forwarded/treated. When the SDN Switch transmits the flow of packets out to a server, the re-written packet headers are used to route the flow of packets.

The system described above reduces the complexity of systems such as IMS when implementing a general purpose telephony service by manipulating forwarding in an SDN Controller in order to simulate the behavior of discrete signaling servers. SDN forwarding and chaining methods are used to reduce network overhead and infrastructure costs when designing a standards-based telephony service.

As the number of physical hops is reduced, service performance is also improved with reduced latency for both signaling and media.

Without SDN, as in the currently used IMS design, a Proxy server, called a Proxy-CSCF, must look at each SIP message, determine which user the message is from, and determine if the user is logged in. If the user is logged in, then the Proxy-CSCF must determine which Serving-CSCF is associated with that user device and forward the packet to that Serving-CSCF. The Proxy-CSCF only sorts messages coming from different users and route them to the correct Serving-CSCF. In an SDN-aware design, packets from an unregistered user device are always forwarded to the Proxy-CSCF. If the SIP message is a REGISTER message then the Proxy-CSCF determines the address of the Serving-CSCF and asks the SDN Controller to forward all packets from that client to the correct Serving-CSCF. The Proxy-CSCF will not see any further messages from that client, they will all be sent directly to the Serving-CSCF by the SDN switch.

Figure 9:
FIG. 9 is a flowchart of a method according to one embodiment.

FIG. 9 depicts a flowchart of a method 1000 according to one embodiment. At step 1002, a request is received from a first client associated with an internet protocol address. At step 1004, a forwarding table is updated to map a processing server to the internet protocol address of the first client based on addressing properties of future packets form the first client to be directed to the processing server. In one embodiment, the addressing properties comprise one of a from address associated with the first client, a from port associated with the first client, a type of service associated with the first client, a service type associated with the first client and a flow label. At step 1006, a processing service is instantiated at the processing server. At step 1008, a request is received from the first client to establish communication with a second client. At step 1010, communication from the first client to the second client is established via the processing service in response to the request to initiate communication with the second client. In one embodiment, establishing communication from the first client to the second client comprises establishing a first telephone call. At step 1012, it is determined that an additional processing service is required for the first telephone call. At step 1014, the additional processing service required for the first telephone call is instantiated in response to the determining that an additional processing service is required. At step 1016, an invite message is received from a third client directed towards the first client to establish a second telephone call between the third client and the first client after termination of the first telephone call. At step 1018, a registrar is searched to check if the first client is available. The registrar is also searched to retrieve the internet protocol of the first client. At step 1020, a relay port is created for the third client included in the invite message. At step 1022, forwarding table configuration instructions are provided to map each internet protocol address and port combination to the relay port. At step 1024, it is determined that no additional processing services are required for the second telephone call. At step 1026, an accept message to the invite message from the first client is received. At step 1028, media from the third client is sent to a relay for delivery to the first client. In one embodiment, the forwarding table is updated when the third client registers. In one embodiment, method 1000 further comprises alerting a user device associated with the first client of the invite message, wherein the receiving the accept message to the invite message is in response to a user input. In one embodiment, the accept message comprises a payload specifying media types that the first client can receive and an internet protocol address and an internet protocol port used for contact with the first client. In one embodiment, method 1000 further comprises the steps of receiving credentials of the first client, testing the credentials against provisioned credentials stored at a credential server, receiving approval of the credentials, and identifying a class of service associated with an account of the first client. In one embodiment, the processing server receives a stream of packets representing encoded segments of one of audio and video media types. In one embodiment, the processing service comprises redirecting a media stream for one of a plurality of processing services. In one embodiment, the processing server is a relay server. In one embodiment, the processing server comprises changing the encoding of a media stream for one of conversion and enhancement.

Figure 10:
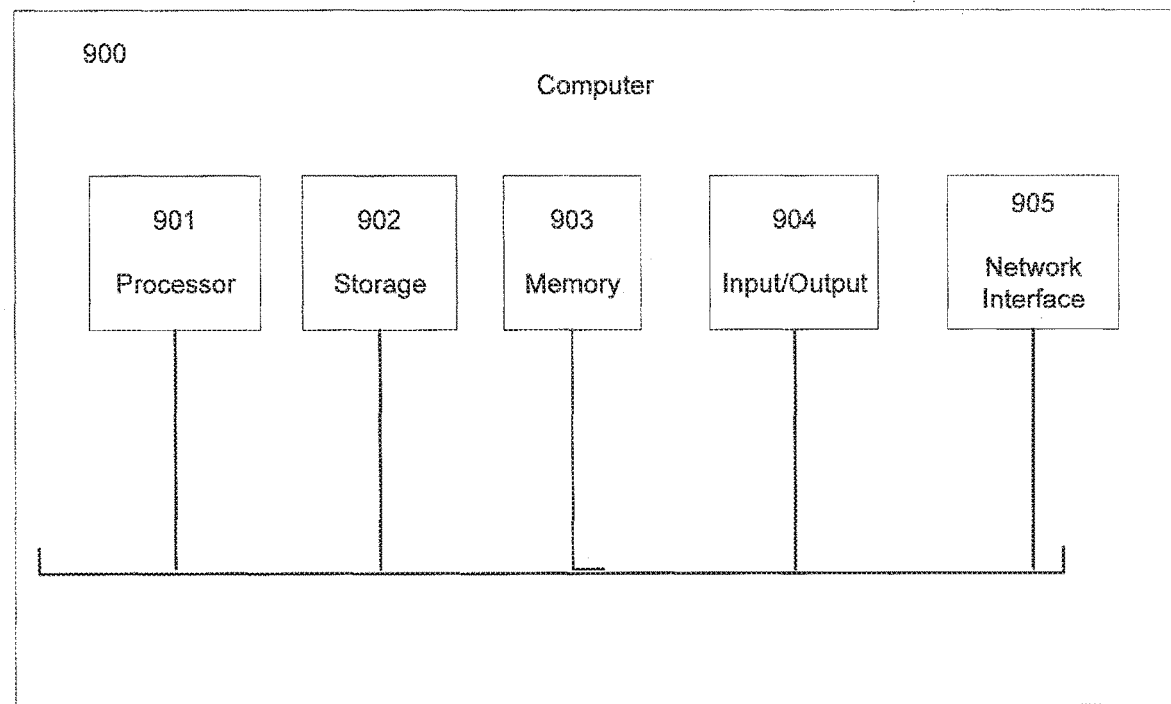
FIG. 10 illustratively depicts components of a computer that may be used to implement various embodiments.

A high-level block diagram of an exemplary computer that may be used to implement systems, apparatus and methods described herein is illustrated in FIG. 10. Computer 900 includes a processor 901 operatively coupled to a data storage device 902 and a memory 903. Processor 901 controls the overall operation of computer 900 by executing computer program instructions that define such operations. The computer program instructions may be stored in data storage device 902, or other computer readable medium, and loaded into memory 903 when execution of the computer program instructions is desired. Network elements depicted in FIGS. 3, 4A, 4B, and 5-7 can each define computer program instructions stored in memory 903 and/or data storage device 902 and controlled by the processor 901 executing the computer program instructions. Computer 900 also includes one or more network interfaces 904 for communicating with other devices via a network. Computer 900 also includes one or more input/output devices 905 that enable user interaction with computer 900 (e.g., display, keyboard, mouse, speakers, buttons, etc.).

Processor 901 may include both general and special purpose microprocessors, and may be the sole processor or one of multiple processors of computer 900. Processor 901 may include one or more central processing units (CPUs), for example. Processor 901, data storage device 902, and/or memory 903 may include, be supplemented by, or incorporated in, one or more application-specific integrated circuits (ASICs) and/or one or more field programmable gate lists (FPGAs).

Data storage device 902 and memory 903 each include a tangible non-transitory computer readable storage medium. Data storage device 902, and memory 903, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 905 may include peripherals, such as a printer, scanner, display screen, etc. For example, input/output devices 905 may include a display device such as a cathode ray tube (CRT) or liquid crystal display (LCD) monitor for displaying information to the user, a keyboard, and a pointing device such as a mouse or a trackball by which the user can provide input to computer 900.

Any or all of the systems and apparatus discussed herein, including user device A 900, SDN Switch A 902, Registration 904, Authentication 906, Credentials 908, Telephony A 910, SDN Controller 912, Registration 914, SDN Switch B 918, Telephony A 910, Telephony GW 920, user device B 922, Int. 924, M.R. A 911, M.R. B 916, and SIP Client 205 may be implemented using a computer such as computer 900.

One skilled in the art will recognize that an implementation of an actual computer or computer system may have other structures and may contain other components as well, and that FIG. 9 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for software defined networking in an internet protocol multimedia subsystem, the method comprising:
   receiving a request from a first client associated with an internet protocol address, wherein the first client is unknown to a registration server of the internet protocol multimedia subsystem prior to the request being received; and
   updating a forwarding table stored on a software defined networking controller of the internet protocol multimedia subsystem in response to the request, wherein the forwarding table is initialized prior to the receiving to forward messages addressed to the internet protocol address to the registration server as a default, the updating comprising:
      mapping a processing server to the internet protocol address based on addressing properties of future packets from the first client to be directed to the processing server, the addressing properties comprising port information associated with the first client, wherein the mapping causes the registration server to be replaced in the forwarding table by the processing server, and wherein the processing server is configured to provide media processing services not provided by the registration server.

2. The method of claim 1, wherein the addressing properties further comprise at least one of: a from address associated with the first client, a from port associated with the first client, a type of service associated with the first client, a service type associated with the first client, or a flow label.

3. The method of claim 1, further comprising:
   instantiating a processing service of the media processing services at the processing server;
   receiving a request from the first client to establish communication with a second client; and
   establishing communication from the first client to the second client via the processing service in response to the request from the first client to establish communication with the second client.

4. The method of claim 3, wherein the establishing communication from the first client to the second client comprises establishing a first telephone call, the method further comprising:
   determining that an additional processing service of the media processing services is required for the first telephone call; and
   instantiating the additional processing service required for the first telephone call in response to the determining.

5. An apparatus comprising:
   a processor; and
   a memory to store computer program instructions for software defined networking in an internet protocol multimedia subsystem, the computer program instructions when executed by the processor cause the processor to perform operations, the operations comprising:
      receiving a request from a first client associated with an internet protocol address, wherein the first client is unknown to a registration server of the internet protocol multimedia subsystem prior to the request being received; and updating a forwarding table stored on a software defined networking controller of the internet protocol multimedia subsystem in response to the request, wherein the forwarding table is initialized prior to the receiving to forward messages addressed to the internet protocol address to the registration server as a default, the updating comprising:

mapping a processing server to the internet protocol address based on addressing properties of future packets from the first client to be directed to the processing server, the addressing properties comprising port information associated with the first client, wherein the mapping causes the registration server to be replaced in the forwarding table by the processing server, and wherein the processing server is configured to provide media processing services not provided by the registration server.

6. The apparatus of claim 5, wherein the addressing properties further comprise at least one of: a from address associated with the first client, a from port associated with the first client, a type of service associated with the first client, a service type associated with the first client, or a flow label.

7. The apparatus of claim 5, the operations further comprising:

instantiating a processing service of the media processing services at the processing server;

receiving a request from the first client to establish communication with a second client; and establishing communication from the first client to the second client via the processing service in response to the request from the first client to establish communication with the second client.

8. The apparatus of claim 7, wherein the establishing communication from the first client to the second client comprises establishing a first telephone call, the operations further comprising:

determining that an additional processing service of the media processing services is required for the first telephone call; and instantiating the additional processing service required for the first telephone call in response to the determining.

9. A non-transitory computer readable medium storing computer program instructions for software defined networking in an internet protocol multimedia subsystem, the computer program instructions, when executed by a processor, cause the processor to perform operations, the operations comprising:

receiving a request from a first client associated with an internet protocol address, wherein the first client is unknown to a registration server of the internet protocol multimedia subsystem prior to the request being received; and updating a forwarding table stored on a software defined networking controller of the internet protocol multimedia subsystem in response to the request, wherein the forwarding table is initialized prior to the receiving to forward messages addressed to the internet protocol address to the registration server as a default, the updating comprising:

mapping a processing server to the internet protocol address based on addressing properties of future packets from the first client to be directed to the processing server, the addressing properties comprising port information associated with the first client, wherein the mapping causes the registration server to be replaced in the forwarding table by the processing server, and wherein the processing server is configured to provide media processing services not provided by the registration server.

10. The non-transitory computer readable medium of claim 9, the addressing properties further comprising at least one of: a from address associated with the first client, a from port associated with the first client, a type of service associated with the first client, a service type associated with the first client, or a flow label.

11. The non-transitory computer readable medium of claim 9, the operations further comprising:

instantiating a processing service of the media processing at the processing server;

receiving a request from the first client to establish communication with a second client; and establishing communication from the first client to the second client via the processing service in response to the request from the first client to establish communication with the second client.

12. The non-transitory computer readable medium of claim 11, wherein the establishing communication from the first client to the second client comprises establishing a first telephone call, the operations further comprising:

determining that an additional processing service of the media processing is required for the first telephone call; and instantiating the additional processing service required for the first telephone call in response to the determining.

13. The method of claim 1, wherein the media processing services comprise at least one of: a call intercept service, a call conversion service, a call enhancement service, a transcoding service, or a media bridge provisioning service.

14. The method of claim 1, wherein the registration server rejects any message that is not a registration message.

15. The method of claim 1, wherein the mapping causes the messages addressed to the internet protocol address to now be forwarded to the processing server.

16. The method of claim 1, wherein the updating is further performed in response to an instruction from the registration server.

17. The apparatus of claim 5, wherein the media processing services comprise at least one of: a call intercept service, a call conversion service, a call enhancement service, a transcoding service, or a media bridge provisioning service.

18. The apparatus of claim 5, wherein the mapping causes the messages addressed to the internet protocol address to now be forwarded to the processing server.

19. The non-transitory computer readable medium of claim 9, wherein the media processing services comprise at least one of: a call intercept service, a call conversion service, a call enhancement service, a transcoding service, or a media bridge provisioning service.

20. The non-transitory computer readable medium of claim 9, wherein the mapping causes the messages addressed to the internet protocol address to now be forwarded to the processing server.

* * * * *